3,259,626
ISOCYANURATE PROCESS
Gerhard Müller, Leverkusen, Rudolf Merten, Cologne-Flittard, and Wilhelm Bunge, Leverkusen, Germany, assignors to Farbenfabriken Bayer Aktiengesellschaft, Leverkusen, Germany, a corporation of Germany
No Drawing. Filed June 21, 1963, Ser. No. 289,734
Claims priority, application Germany, July 5, 1962, F 37,236
5 Claims. (Cl. 260—248)

This invention relates to isocyanate compositions and more particularly to novel isocyanurates and their methods of preparation.

It is known to produce polymerized isocyanates by the use of catalysts of metal compounds which are soluble in diisocyanates. A process similar to this is disclosed in Belgian patent specification 451,954. It is also known that organic isocyanates can be trimerized by the use of basic catalysts to form n-substituted isocyanates. It is not possible, however, to trimerize by these known processes aliphatic isocyanates having aliphatically-combined halogen groups. Excluded, therefore, from these reactions are isocyanates with aliphatically-combined halogen atoms, since these halogen atoms enter into the reciprocal action with the basic catalysts used.

It is, therefore, an object of this invention to provide a process for trimerizing isocyanates having aliphatically-bonded halogen groups. Another object of this invention is to provide a process for the production of isocyanurates via monomeric or polymeric isocyanates having aliphatically-combined isocyanate and halogen groups. Still another object of this invention is to provide a process for the production of isocyanurates which comprises the use of halogenated starting materials not heretofore utilized in this type of process. Yet a still further object of this invention is to provide a process for the production of trimerized isocyanates which are useful in the production of stable coatings, adhesives and the like. Still another object of this invention is to provide novel halogenated isocyanurate compositions.

The foregoing objects and others which will become apparent from the following description are accomplished, generally speaking, by providing a process for the polymerization of an isocyanate having aliphatically-combined isocyanato and halogen groups in an inert anhydrous polar solvent in the presence of a catalytic amount of a Friedel-Crafts catalyst. The polymerization can be effected either at ordinary room temperature or at elevated temperatures. Preferably, the reaction is carried out at elevated temperatures and most preferably of from about 50° C. to about 150° C.

Any catalytic amount of catalyst can be used, but for best results, it is preferred to use from about 1% to about 20% by weight catalyst based on the weight of isocyanate used. Aliphatic as used in this disclosure is meant to include alicyclic. Halogen as used in this disclosure is meant to include chlorine and bromine.

After the trimerization reaction is substantially complete, the catalyst is removed by any conventional process such as, by washing with water or filtration. The product remaining after removing the catalyst is then purified, for example, by distillation or crystallization to obtain the desired isocyanurate composition. It is possible by using the presently defined process to trimerize monoisocyanates having aliphatically combined isocyanate and halogen radicals. It is known that aliphatic isocyanates free of halogen atoms can be trimerized by the action of Friedel-Crafts catalysts. With halogenated aliphatic isocyanates, however, it has been found that the known procedure does not work. It has been found that it is necessary to have a polar solvent present when such a halogenated isocyanate is to be trimerized. This trimerization procedure is unexpected in that by the action of Friedel-Crafts catalysts on aliphatic isocyanates with reactive halogen atoms, reciprocal action with complex formations are to be expected, especially since the trimerization does not occur in the absence of an anhydrous polar solvent. The novel isocyanurate compositions made by the process of this invention contain at least one isocyanurate ring in which each of the nitrogen atoms of the isocyanurate ring is attached to a carbon atom selected from the group consisting of aliphatic carbon atoms and alicyclic carbon atoms, said carbon atoms also containing aliphatically bound halogen atoms. The novel isocyanurates produced by the present process provide novel compositions useful in the production of coatings and adhesives. These products may be made, for example, in a manner similar to that discussed in "Chemical Week," Nov. 1, 1960, pages 27 to 32. The coatings and adhesives made from the present isocyanurates, however, are more stable than the corresponding coatings or adhesives made from aromatic diisocyanate compositions discussed in the above-noted article.

Novel isocyanurates prepared according to the present invention are for instance: N,N',N"-tris-chloroethyl isocyanurate, N,N',N"-tris-chloropropyl isocyanurate, N,N',N"-tris-chlorohexyl isocyanurate, N,N',N"-tris-chlorobutyl isocyanurate, N,N',N"-tris-chloropentyl isocyanurate, N,N'N"-tris-bromoethyl isocyanurate, N,N'N"-tris-bromohexyl isocyanurate, N,N',N" - tri-ω-cholorobutoxypropyl isocyanurate, N,N' - bis-chloroethyl - N"-chlorohexyl isocyanurate, N,N' - bis - chlorohexyl - N"-bromoethyl isocyanurate.

Any suitable monoisocyanate with aliphatically-combined isocyanate and halogen radicals can be trimerized by the process of the present invention. Typical isocyanates which may be used are ω-haloalkyl isocyanate, 1 - chloroethyl isocyanate, 1 - bromoethyl - 2 - isocyanate, 1-chloropropyl isocyanate, 1-bromopropyl-3-isocyanate, 1-cholorbutylether propyl isocyanate, 6-chlorohexyl isocyanate, 6-bromohexyl isocyanate, ω-chlorooctadecylisocyanate, 4-chlorocyclohexyl isocyanate, 4-bromocyclohexyl isocyanate, 4-chloromethyl-cyclohexyl isocyanate, p-chloromethyl-hexylisocyanate and α-halogen substituted alkyl isocyanate and the like. The α-halogen substituted alkyl isocyanates are the type discussed in German Patent 1,122,058. Mixtures of the above isocyanates can also be trimerized in the same procedure.

Any suitable Friedel-Crafts catalyst can be used in the present invention such as, for example, those catalysts discussed in "Encyclopedia of Chemical Technology" by Kirk and Othmer, vol. 6, 1961, pages 883 to 891. A list of specific catalysts are given on pages 883 to 887 of the above publication. Typical of these catalysts are anhydrous zinc chloride, stannic chloride, ferric chloride, antimony pentachloride, chromic chloride, aluminum chloride, boron trifluoride, hydrogen fluoride and its adduct with ether and acetic acid.

Any suitable inert anhydrous polar solvent may be used in the present invention as a solvent. Typical solvents for the present trimerization reaction are inert polar solvents such as, esters, ethers, ketones and amides. Acetic acid ethyl ester, glycol monoethyl ether acetate, acetone, tetrahydrofuran, dimethyl sulphoxide, cyclohexanone, dioxane, acetophenone, butyrolactone, dimethylsulphone, tetramethylene sulphone, dimethyl acetamide, and dimethyl formamide are typical of those solvents which may be used in the herein defined process.

The reaction mixture is worked up in the usual way, by first of all removing the catalyst, for example, by washing it out with water and then purifying the reaction product, for example, by distillation or crystallization.

In order that the invention may be more clearly understood, the following examples are given by way of illustration; parts being by weight unless otherwise specified.

*Example 1*

A solution of about 646 parts by weight of 6-chlorohexyl isocyanate and about 20 parts by weight of anhydrous zinc chloride in about 500 parts by volume of acetic acid ethyl ester (distilled over hexamethylene diisocyanate) are stirred for about 50 hours at about 75° C. The isocyanate content of the reaction mixture has then decreased to about 0.18%. For working-up purposes, the solution is extracted by shaking it several times with water and the solvent is distilled off. About 606 parts by weight of the N,N',N''-tris-(6-chlorohexyl)-isocyanurate are obtained as a viscous reaction product. The infra-red spectrum confirms the indicated structure.

The N,N',N''-tris-(6-chlorohexyl)-isocyanurate shows a fungistatic and bacteriostatic activity against *Penicillium glaucum*, *Aspergillus niger* and *Bacterium coli*.

*Example 2*

A solution of about 106 parts by weight of 1-chloroethyl-2-isocyanate and about 10 parts by weight of anhydrous zinc chloride in about 100 parts by weight of glycol monomethyl ether acetate is stirred for about 50 hours at about 140° C., the isocyanate content falling from about 17.8% to about 4.5%. The reaction mixture is worked up as described in Example 1. About 75 parts by weight of N,N',N''-tris-($\beta$-chloroethyl)-isocyanurate are obtained as a viscous reaction product. The infra-red spectrum confirms the structure indicated.

Instead of zinc chloride, it is also possible to use anhydrous aluminum chloride, tin-4-chloride or iron-3-chloride for carrying out the reaction.

*Example 3*

In a manner analogous to Examples 1 and 2, about 360 parts by weight of 1-chloropropyl-3-isocyanate, dissolved in about 300 parts by weight of glycol monomethyl ether acetate and in the presence of about 20 parts by weight of anhydrous zinc chloride are trimerized with about 95% yield to N,N',N''-tris-($\alpha$-chloropropyl)-isocyanurate. The structure of the viscous reaction product is confirmed by the infra-red spectrum.

*Example 4*

A solution of about 412 parts by weight of 6-bromohexyl isocyanate and about 10 parts by weight of antimony-V-chloride in 250 parts by volume of acetophenone are stirred for about 30 hours at 70° C., the isocyanate content falling to practically nil. The reaction mixture is worked up by shaking it several times with water and the solvent is distilled off in vacuo. About 392 parts by weight of the N,N',N''-tris-(6-bromohexyl)-isocyanurate are obtained as a viscous reaction product. The infra-red spectrum confirms the indicated structure.

*Example 5*

A solution of about 323 parts by weight of 6-chlorohexyl isocyanate, 206 parts by weight of 6-bromohexyl isocyanate and about 10 parts by weight of stannic chloride in 300 parts by volume of dimethylsulfoxide are stirred for about 30 hours at 70° C. The isocyanate content of the reaction mixture has then decreased to practically nil. For working up the reaction mixture the solvent is distilled off in vacuo and the residue disssolved in ethyl acetate. The solution is extracted by shaking it several times with water. The ethyl acetate solution is evaporated. About 501 parts by weight of N,N'-bis-(6-chlorohexyl) - N'' - (6-bromohexyl)-isocyanurate are obtained. The infrared spectrum confirms the indicated structure.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of preparing polymeric organo isocyanates which comprises contacting an organo isocyanate having aliphatically-combined isocyanato and halogen groups in the presence of an anhydrous inert polar solvent with a catalytic amount of a Friedel-Crafts catalyst under polymerization conditions to form polymeric isocyanates having the same total number of halogen groups as the initial isocyanates.

2. A method for the production of isocyanurates which comprises mixing at a temperature of about 50 to about 150° C. in an inert anhydrous polar solvent, an organo monoisocyanate having aliphatically-combined isocyanato and halogen groups and from about 1 to about 20% of a Friedel-Crafts catalyst, obtaining thereby a crude trimerization mixture, removing said catalyst from said crude mixture and recovering an isocyanurate having the same total number of halogen groups as the initial isocyanates.

3. A method for preparing trimeric organo isocyanates which comprises contacting an organo mono-isocyanate having aliphatically-combined isocyanato and halogen groups in the presence of an anhydrous polar solvent with a catalytic amount of a Friedel-Crafts catalyst under polymerization conditions to form trimeric isocyanates having the same total number of halogen groups as the initial isocyanates.

4. The method of claim 3 wherein said polar solvent is selected from the group consisting of esters, ethers, ketones and amides.

5. The method of claim 3 wherein said trimerization is carried out at a temperature of about 50 to about 150° C. and said catalyst being present in an amount of from about 1% to about 20% by weight based on the weight of said aliphatic isocyanate.

References Cited by the Examiner

UNITED STATES PATENTS

| 2,866,801 | 12/1958 | Himel et al. | 260—248 XR |
| 2,977,360 | 3/1961 | Dixon | 260—248 |

FOREIGN PATENTS

| 858,810 | 1/1961 | Great Britain. |

OTHER REFERENCES

White, The Journal of the Society of Dyers and Colourists, vol. 70, No. 11, p. 482 (1954), TP 890.S6.

Smolin et al., "s-Triazines and Derivatives," pp. 403 and 406 and 410–412, Interscience Publishers, Inc. (N.Y.) (1959), QD 401 S62.

Chemical Abstracts, vol. 55, cols. 21, 139–21, 140 (1961) [abstracts of Dokunikhin, Org. Poluprod. i Krastieli Nauch-Issledovatel, Inst. Org. Poluprod. i Krasiteli im K. E. Voroshivlova, Sbornik Statei, 1959, No. 1, pp. 148–159].

WALTER A. MODANCE, *Primary Examiner*.

JOHN D. RANDOLPH, *Assistant Examiner*.